Patented Sept. 17, 1929

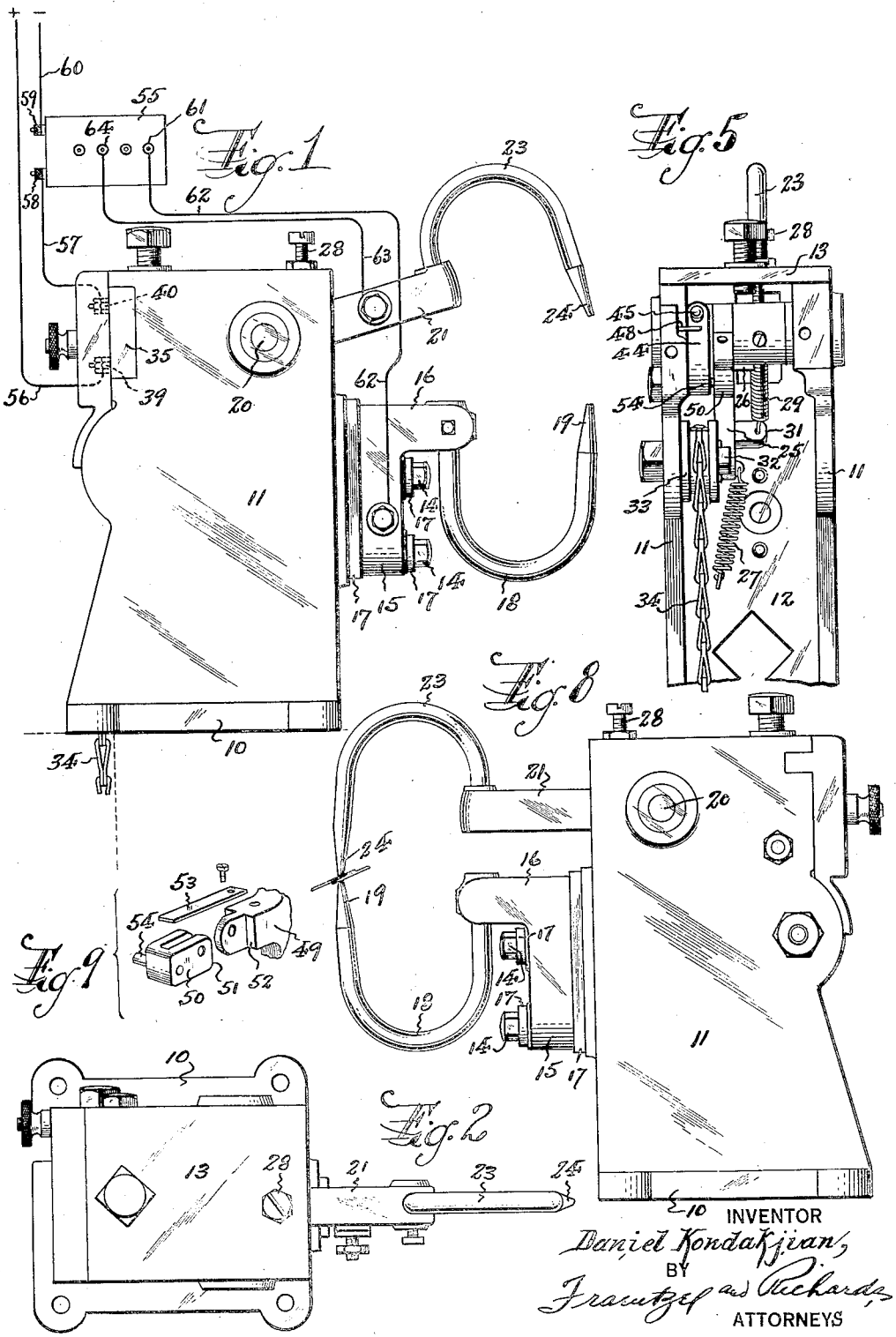

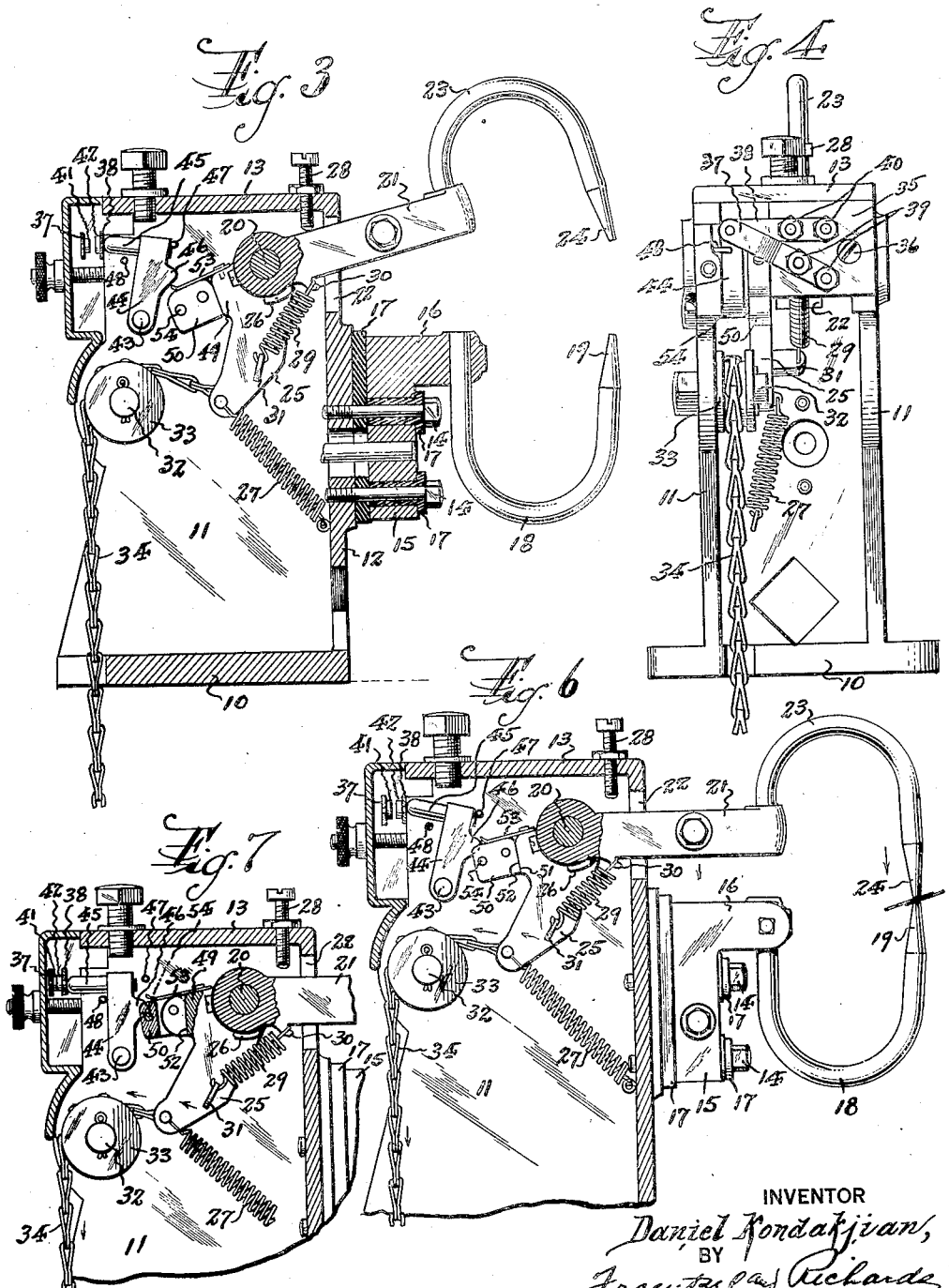

1,728,616

UNITED STATES PATENT OFFICE

DANIEL KONDAKJIAN, OF NEWARK, NEW JERSEY

ELECTRIC SPOT-WELDING MACHINE

Application filed December 12, 1925. Serial No. 74,961.

This invention relates, generally, to improvements in electric spot welding machines; and the invention has reference, more particularly, to a simply constructed and easily actuated spot welding machine provided with electrodes having an initial mechanical clamping action to position and hold the work, in combination with a novel means for controlling the flow of electric current therethrough after the work is operatively engaged by the electrodes.

The invention has for its principal object to provide a simple construction of electric spot welding machine provided with normally separated electrodes, and a novel circuit make and break means for controlling the flow of electric current through said electrodes, together with a novel means for producing timed actuation of said electrodes and circuit make and break means whereby the electrodes are moved into clamping or holding engagement with the work in advance of delivery of electric current through the electrodes by the closing of said circuit make and break device.

Another object of this invention is to provide a novel arrangement of circuit make and break means and actuating means therefor which momentarily closes the circuit while the electrodes of the machine are operatively engaged with the work.

Other objects of this invention, not at this time more particularly enumerated, will be clearly understood from the following detailed description of the same.

The invention is clearly illustrated in the accompanying drawings, in which:—

Figure 1 is a side elevation of the novel electric spot welding machine made according to and embodying the principles of this invention; Figure 2 is a top end view of the same; Figure 3 is a longitudinal vertical section through the same; Figure 4 is a rear end elevation of the same, with a cover plate removed to show internal parts; Figure 5 is a view similar to that shown in Figure 4, but with parts removed to show inwardly lying parts; Figure 6 is a vertical section with the electrodes moved by actuation of the mechanism into work engaging and holding position prior to the services of electric current therethrough; Figure 7 is a similar fragmentary view showing the circuit make and break means, with the actuating means therefor operating to close the same to deliver current through the work engaging and holding electrodes; Figure 8 is an opposite side elevation showing the electrodes in work engaging and holding position; and Figure 9 is a fragmentary perspective of disassembled parts of the circuit make and break tripping means.

Similar characters of reference are employed in all of the hereinabove described views, to indicate corresponding parts.

Referring now to said drawings, the reference character 10 indicates the base of a suitable frame-work for supporting the operative parts of the mechanism; said frame-work comprising spaced side walls, 11, a front wall 12 joining said side walls, and a top wall 13. Secured to the exterior side of said front wall 12 by bolts 14 is a bracket member 15 having a forwardly projecting arm 16. Said bracket member 15 is electrically insulated from said frame-work, and from the fastening bolts 14, by means of interposed bodies of insulation material 17. Secured to the arm 16 of said bracket member 15 is an electrode 18, preferably in the form of a U-shaped member having a forwardly off-set upturned free end portion 19.

Journaled in and extending between the side walls 11 of said frame-work, adjacent to the upper ends thereof, is a transverse shaft 20. Fixed on said shaft 20 is a forwardly projecting carrier-arm 21, which extends through an opening 22 provided in the front wall 12 of said frame-work above the bracket member 15. Secured to the outer end portion of said arm is an electrode 23, preferably in the form of an inverted U-shaped member having a forwardly off-set downturned free end portion 24. Said electrodes 18 and 23 are vertically aligned, so that when the latter is properly actuated its free end portion 24 moves toward and is opposed to the free end portion 19 of the former.

Rotatably movable or pivoted on said shaft 20, at one side of said carrier-arm 21, is a depending actuating lever 25, which is provided, at the side thereof adjoining said carrier-arm 21, with a laterally projecting lift-lug 26 which normally engages the underside of said carrier-arm 21. Interconnected between the lower free end of said actuating lever 25 and the front wall 12 of said frame-work is a pull-spring 27 which normally swings forward, and holds in forwardly swung position, said actuating lever 25. The normal forwardly swung position of said actuating lever 25 carries its lift lug 26 into lifting engagement with said carrier-arm 21, to thus swing the latter to upwardly raised position against an adjustable stop-screw 28, and thereby position said electrodes 18 and 23 in normally separated relation; said stop-screw 28 thus serves to determine the normal initial or inactive position of both said carrier-arm 21 and said actuating lever 25. Said carrier-arm 21 and said actuating lever 25 are yieldably coupled together by means of an interconnecting coupling spring 29, which is anchored by one end to a lug 30 on the underside of said carrier-arm 21, and by the opposite end to a lug 31 projecting from the side of said actuating lever 25 near its free end.

The reference character 32 indicates an inwardly extending stud-shaft connected with one side wall 11 and rearwardly spaced from the lower free end of said actuating lever 25. Rotatably mounted on said stud-shaft 32 is a flanged roller 33. Connected with the free end of said actuating lever 25 is a pull-chain 34, which extends rearwardly and over said roller 33, and thence downwardly to a foot-lever or treadle (not shown). As will be understood, by depressing the foot-lever or treadle, the chain 34 is pulled downward over the roller 33, thus producing an operative rearward swinging movement of said actuating lever 25.

Suitably supported in connection with the rear side of said frame-work, and adjacent to its upper end, is a supporting plate 35, preferably made of an insulation material. Said supporting plate 35 is secured by a fastening screw 36 to the rear edge-portion of one side wall 11 so as to extend laterally, but in vertical plane, partially across the rear of said frame-work. Mounted on said supporting plate 35 are a pair of resilient contact arms 37 and 38, suitably secured thereto respectively by nut and bolt fastenings 39 and 40, which may also serve as binding posts for connecting circuit wires thereto. Said contact arms 37 and 38 project beyond the inner vertical edge of said supporting plate 35, and are so relatively disposed that the free end of the one contact arm 37 is aligned with the free end of the other contact arm 38, but normally spaced apart or off-set one from the other. The facing or opposed sides of said free end portions of said arms 37 and 38 are respectively provided with contact points 41 and 42, adapted to be moved together into circuit closing engagement, in the manner subsequently to be described.

Pivoted on a fulcrum stud 43, connected with a side wall 11 and within the frame-work, is an upwardly extending presser-piece 44, having adjacent to its free end a rearwardly projecting stud 45 which is adapted to engage the free end portion of the contact arm 38. Said stud 45 is made of insulating material, or at any rate is insulated from electrical contact with said presser-piece 44. Formed in connection with the forward side of said presser-piece 44, intermediate its pivoted and free ends, is a cam-projection 46. Suitable stops 47 and 48 may be provided, if desired, for limiting the movement of said presser-piece 44 respectively in each direction. Connected with said actuating lever 25, intermediate its pivoted and free ends, is a rearwardly projecting arm 49. Connected with the free end of said arm 49 is a trigger-piece 50 which is eccentrically pivoted so as to be supported by the engagement of its lower inner end portions 51 with shoulders 52 of said arm and thus held rigidly against downward swinging movement, while being nevertheless yieldable to upward swinging movement against the tension of a leaf-spring 53 secured upon said arm so that its free end bears tensionally upon the upper side of said trigger-piece 50. Said trigger-piece 50 is provided adjacent to its free end with a laterally projecting trip lug 54, the path of movement of which, when said actuating lever 25 and arm 49 are oscillated, is aligned with the cam-projection 46 of said pressure-piece 44.

Referring now to Figure 1 of the drawings, one method of connecting the novel spot welding machine with a source of electric current is shown for the purpose of illustrating the operation of the machine. It will be understood, however, that I do not limit myself to this particular method or system of supporting the necessary electrical energy, but may employ any other method or system according to the kind of current, or as other conditions at the place of use of the machine may render advisable. For small work a low voltage direct current is passed through the electrodes. If the electrical service line delivers alternating current of relatively high voltage, the same may be transformed to direct current of properly reduced voltage by means of a suitable transformer, all in the manner familiar to electricians. This latter arrangement is that illustrated in Figure 1, in which the reference character 55 indicates a transformer. The incoming wire 56 of the service line is connected with the contact arm 37 through a bolt and nut 39. From the other contact arm 38 extends a conductor 57, secured thereto by a bolt and nut 40, which leads to one pole 58 of said transformer 55. The opposite pole 59 of said transformer is connected with the outgoing or return wire 60 of the service line. The transformed current is delivered from a selected transformer tap 61 through the conductor 62 to the bracket member 15 and its electrode 18, the circuit being completed through the opposite electrode 23 and carrier-arm 21 by way of the conductor 63 which leads back to another selected transformer tap 64.

In operating the device, the portions of the work to be welded are engaged over the extremity 19 of the stationary electrode 18. The operator now exerts a pull upon the chain 34 which pulls rearward the actuating lever 25, and through the yieldable spring coupling 29 the movement of the latter is transmitted to the carrier arm 21, which is thus caused to swing downward, thereby moving the electrode 23 downward so that its extremity 24 engages the work, and clamps the latter intermediate and in operative electrical contact with the opposed electrodes 18 and 23. The rearward swinging movement of said actuating lever 25, in its first phase, swings the presser piece 44 upwardly with the trip-lug 54 of its trigger-piece 50 disposed beneath the cam-projection 46 of said presser piece ready for circuit closing actuation of the latter after the electrodes 18 and 23 have firmly engaged the work, as shown in Figure 6. Continued movement of the actuating lever will carry the trip-lug 54 over the cam-projection 46, the yieldable coupling spring 29 permitting the continued movement of the actuating lever 25 while at the same time holding the electrodes in work engaging position. In passing the cam-projection 46 the trip-lug 54 cooperates therewith to produce a rearward swinging movement of the presser-piece 44, whereby its stud 45 engages and moves the contact arm 38 toward the contact arm 37, thus electrically engaging the respective contact points 41 and 42 together, and thereby closing the service circuit through the transformer 55, as shown in Figure 7. The transformer being thus energized, suitably transformed current will be delivered through the work engaging electrodes 18 and 23. The delivery of current is momentary, since as soon as the trip-lug 54 passes off from the cam-projection the resilient contact arm 38, due to its inherent tension, separates from arm 37, thereby interrupting the circuit and pressing against the end of the stud 45, thus swinging the presser piece on its pivot and causing it to resume its initial position; the electrodes being still maintained in holding engagement with the work, however, until the pull on the chain 34 is relaxed. It will thus be understood that a relatively quick electrical make and break is provided for, so that overheating or other destructive or undesired effects upon the work are avoided. When the operator relaxes the pull on the chain 34, the actuating-lever 25 will be returned to normal initial position by the pull-spring 27, and upon consequent return movement of arm 49, the trigger-piece 50 will yield upwardly against the tension of the spring 53 to allow the trip-lug 54 to ride over the cam-projection of the presser-piece 44, without moving the latter into actuating relation to the circuit make and break means. As the actuating lever 25 approaches completion of its return movement, the lift lug 26 thereof will again engage the underside of the carrier-arm 21 to swing the same upward, and thus raise the electrode 23 into normal initial separated relation to the electrode 18.

I am aware that some changes may be made in the various arrangements and combinations of the devices and parts, as well as in the details of the construction of the same, without departing from the scope of this invention as set forth in the foregoing specification and as defined in the appended claim. Hence, I do not limit my invention to the exact arrangements and combinations of said devices and parts as described in the foregoing specification, nor do I confine myself to the exact details of the construction of said parts as illustrated in the accompanying drawings.

I claim:—

An electric spot welding machine comprising, a frame-work having a front wall, side walls and a top wall, a stationary electrode mounted upon said front wall, a pivotal shaft mounted in and extending transversely between said side walls within said frame-work, a movable electrode pivotally mounted on said shaft and extending through an aperture in said front wall for cooperating with said stationary electrode, an electrode actuating lever mounted on said pivotal shaft adjacent said movable electrode within said frame work and movable independently of said electrode but having means to lift the latter into normal separated relation to said stationary electrode, yieldable coupling means extending between said actuating lever and said movable electrode for transmitting operative movement of said lever to said electrode, spring means connected to the interior of said front wall and to said actuating lever for biasing said actuating lever so as to effect the positioning of said movable electrode in its normal separated relation to said stationary electrode, means for manipulating said actuating lever, cooperating contacts positioned within said frame work at the rear thereof and carried by said side walls, said contacts being adapted to control the delivery of current through said electrodes, a pivoted presser-piece mounted within said frame-work for operating said cooperating contacts, said presser-piece having a cam-projection and trip-means carried by said actuating lever to cooperate with said cam-projection during operative movement of said actuating lever to cause said presser-piece to momentarily close said contacts after said pivoted electrode is moved into mutual work engaging relation to said stationary electrode, said trip-means being yieldable relative to said cam-projection upon retractive movement of said actuating lever.

In testimony, that I claim the invention set forth above I have hereunto set my hand this 9th day of December, 1925.

DANIEL KONDAKJIAN.